US008643802B2

(12) United States Patent
Ting et al.

(10) Patent No.: US 8,643,802 B2
(45) Date of Patent: Feb. 4, 2014

(54) PIXEL ARRAY, POLYMER STABLIZED ALIGNMENT LIQUID CRYSTAL DISPLAY PANEL, AND PIXEL ARRAY DRIVING METHOD

(75) Inventors: Tien-Lun Ting, Taichung (TW);
Yu-Ching Wu, Kaohsiung (TW);
Wen-Hao Hsu, Hsinchu County (TW);
Yi-Cheng Li, Taipei County (TW)

(73) Assignee: Au Optronics Corporation, Hsinchu (TW)

( * ) Notice: Subject to any disclaimer, the term of this patent is extended or adjusted under 35 U.S.C. 154(b) by 481 days.

(21) Appl. No.: 12/954,685

(22) Filed: Nov. 26, 2010

(65) Prior Publication Data

US 2012/0019754 A1    Jan. 26, 2012

(30) Foreign Application Priority Data

Jul. 20, 2010 (TW) ............................... 99123833 A

(51) Int. Cl.
*G02F 1/136*      (2006.01)
*G02F 1/1343*     (2006.01)

(52) U.S. Cl.
USPC ........................................... 349/48; 349/144

(58) Field of Classification Search
USPC .................................................. 349/48, 144
See application file for complete search history.

(56) References Cited

U.S. PATENT DOCUMENTS

| 6,850,302 | B2 | 2/2005 | Song | |
|---|---|---|---|---|
| 7,206,048 | B2 | 4/2007 | Song | |
| 2007/0268434 | A1* | 11/2007 | Huang et al. | 349/129 |
| 2009/0268112 | A1* | 10/2009 | Lu et al. | 349/38 |
| 2010/0066934 | A1* | 3/2010 | Kim et al. | 349/39 |
| 2011/0019114 | A1* | 1/2011 | Tsubata | 349/38 |
| 2011/0169018 | A1* | 7/2011 | Hsiao et al. | 257/88 |

FOREIGN PATENT DOCUMENTS

| CN | 101782703 | 7/2010 | |
|---|---|---|---|
| WO | WO 2009130922 A1 * | 10/2009 | H01L 21/77 |

OTHER PUBLICATIONS

AU Optronics Corp., Jul. 21, 2010, Machine Translation of CN 101782703 using EPO Patent Translate, pp. 1-9.*
"First Office Action of China Counterpart Application", issued on Jun. 22, 2011, p. 1-p. 7, in which the listed reference was cited.

* cited by examiner

*Primary Examiner* — Edward Glick
*Assistant Examiner* — Dennis Y Kim
(74) *Attorney, Agent, or Firm* — Jianq Chyun IP Office

(57) ABSTRACT

A pixel array including a plurality of scan lines, data lines, and sub-pixels is provided. Each of the sub-pixels arranged in the $n^{th}$ row includes a first switch, a first pixel electrode, a second switch, a third switch, and a second pixel electrode. The first switch and the second switch are electrically connected to the $n^{th}$ scan line and the $m^{th}$ data line. The first switch and the first pixel electrode are electrically connected. The second switch has a first signal output terminal. The third switch is electrically connected to the $(n+i)^{th}$ scan line. The third switch has a signal input terminal electrically connected to the first signal output terminal and a second signal output terminal. The first signal output terminal is electrically insulated from the first pixel electrode and the second pixel electrode. The first signal output terminal extends to the underneath of the second pixel electrode.

12 Claims, 11 Drawing Sheets

PIXEL ARRAY, POLYMER STABLIZED ALIGNMENT LIQUID CRYSTAL DISPLAY PANEL, AND PIXEL ARRAY DRIVING METHOD

CROSS-REFERENCE TO RELATED APPLICATION

This application claims the priority benefit of Taiwan application serial no. 99123833, filed on Jul. 20, 2010. The entirety of the above-mentioned patent application is hereby incorporated by reference herein and made a part of this specification.

BACKGROUND OF THE INVENTION

1. Field of the Invention

The invention relates to a pixel array and more particularly to a pixel array with favorable display quality.

2. Description of Related Art

With the progressing development of liquid crystal displays (LCDs) for large size display, wide-viewing angle of LCD panels also needs to be improved continuously to overcome the viewing-angle of large size displays. Here, multi-domain vertical alignment (MVA) LCD panels and polymer stabilized alignment (PSA) LCD panels are conventional wide viewing-angle technologies. To improve color washout in these LCD panels, advanced-MVA LCD panels have been provided. In the advanced-MVA LCD panels, each of the sub-pixel regions is divided into a main display region and a sub-display region. Through suitable circuit design and driving method, driving voltages of the main display region and the sub-display region in the same pixel are different so as to improve color washout. In conventional technology, the design concept of the sub-pixel regions having a main display region and a sub-display region has been applied in PSA LCD panels.

FIG. 1 is an equivalent circuit diagram of a pixel array. FIG. 2 illustrates a schematic diagram of a single sub-pixel in FIG. 1. Referring to FIGS. 1 and 2, a pixel array 100 includes a plurality of sub-pixels P1 arranged in an array. Each of the sub-pixels P1 includes a first thin film transistor (TFT) TFT1, a second thin film transistor TFT2, a third thin film transistor TFT3, a first pixel electrode ITO1 electrically connected to the first thin film transistor TFT1, and a second pixel electrode ITO2 electrically connected to the second thin film transistor TFT2. The first pixel electrode ITO1 is coupled to a common line COM1 to generate a first storage capacitance Cs1. The first pixel electrode ITO1 is coupled to a common electrode (not shown) on an opposite substrate (i.e. a color filter substrate) to generate a first liquid crystal capacitance CLC1. Similarly, the second pixel electrode ITO2 is coupled to a common line COM2 to generate a second storage capacitance Cs2. The second pixel electrode ITO2 is coupled to a common electrode (not shown) on an opposite substrate (i.e. a color filter substrate) to generate a second liquid crystal capacitance CLC2.

As shown in FIGS. 1 and 2, in the sub-pixel P1 electrically connected to a scan line SL(n−1), a gate G1 in the first thin film transistor TFT1 and a gate G2 in the second thin film transistor TFT2 are electrically connected to the scan line SL(n−1) respectively. Moreover, a gate G3 in the third thin film transistor TFT3 is electrically connected to a scan line SL(n) subsequently. In addition, a source S3 of the third thin film transistor TFT3 is electrically connected to the second pixel electrode ITO2, a drain D3 of the third thin film transistor TFT3 is coupled to the first pixel electrode ITO1 to generate a first capacitance Ccs-a, and a drain D3 of the third thin film transistor TFT3 is coupled to the common line COM1 underneath the first pixel electrode ITO1 to generate a second capacitance Ccs-b. When a high voltage (Vgh) is applied to the scan line SL(n−1), an image data is recorded into the sub-pixel connected to the scan line SL(n−1) through data lines DL(m−1) and DL(m). At this time, the first pixel electrode ITO1 and the second pixel electrode ITO2 have the same voltage. Next, when a high voltage is applied to the scan line SL(n), coupling effect of the first capacitance Ccs-a and the second capacitance Ccs-b makes a voltage of the first pixel electrode ITO1 and a voltage of the second pixel electrode ITO2 to be different.

Since a drain D2 of the second thin film transistor TFT2 is overlapped with the first pixel electrode ITO1 and electrically connected with the second pixel electrode ITO2, a parasitic capacitance Cx1 is generated between the drain D2 of the second thin film transistor TFT2 and the first pixel electrode ITO1. In addition, as the drain D3 of the third thin film transistor TFT3 is overlapped with the second pixel electrode ITO2, a parasitic capacitance Cx2 is generated between the drain D3 of the third thin film transistor TFT3 and the second pixel electrode ITO2. The parasitic capacitance Cx1, Cx2 decrease the voltage difference range of the first pixel electrode ITO1 and the second pixel electrode ITO2, so that the color washout can not be improved effectively. Accordingly, it is necessary to prevent the parasitic capacitance Cx1, Cx2 in the sub-pixel P1 from affecting display quality.

SUMMARY OF THE INVENTION

The invention is related to a pixel array, a polymer stabilized alignment liquid crystal display (PSA-LCD) panel, and a driving method of a pixel array. The pixel array of the invention has favorable display quality.

The invention is directed to a pixel array including a plurality of scan lines, a plurality of data lines, and a plurality of sub-pixels. The data lines intersect with the scan lines to define a plurality of sub-pixel regions. The sub-pixels are disposed in the sub-pixel regions. Each of the sub-pixels is electrically connected to two adjacent scan lines and one of the data lines. Each of the sub-pixels arranged in an $n^{th}$ row includes a first switch, a first pixel electrode, a second switch, a third switch, and a second pixel electrode. The first pixel electrode is electrically connected to the first switch. The first switch and the second switch are electrically connected to an $n^{th}$ scan line and an $m^{th}$ data line, and the second switch has a first signal output terminal. The third switch is electrically connected to an $(n+i)^{th}$ scan line. The third switch has a signal input terminal electrically connected to the first signal output terminal and a second signal output terminal. Here, i is a positive integer. The second pixel electrode is electrically connected to the second signal output terminal. The first signal output terminal is electrically insulated from the first pixel electrode and the second pixel electrode. The first signal output terminal extends to the underneath of the second pixel electrode to generate a coupling capacitance with the second pixel electrode.

The invention is further directed to a polymer stabilized alignment liquid crystal display (PSA-LCD) panel including a first substrate, a second substrate, two PSA layers, and an LC layer. The first substrate has a pixel array aforementioned. The second substrate is disposed above the first substrate. Two PSA layers are disposed on the first substrate and the second substrate respectively. The LC layer is disposed between the PSA layers.

The invention is further directed to a driving method of a pixel array, and this driving method is suitable for driving a pixel array aforementioned. The driving method of the pixel array includes the following. The scan lines mentioned above are turned on sequentially and an image data is recorded to each of the sub-pixels through the data lines. When a turn on voltage is applied to an $n^{th}$ scan line for turning on the first switch and the second switch, the first pixel electrodes and the first signal output terminals of the sub-pixels arranged in an $n^{th}$ row are conducted with a corresponding data line, and a voltage of the second pixel electrode is changed due to a coupling of the first signal output terminal. When a turn on voltage is applied to an $(n+i)^{th}$ scan line for turning on the third switch, the second pixel electrodes and the first signal output terminals of the sub-pixels arranged in the $n^{th}$ row are conducted.

In light of the foregoing, since the first signal output terminal of the second switch is electrically connected to the third switch, the third switch is electrically connected to the second pixel electrode, and the first signal output terminal and the second pixel electrode generate the coupling capacitance, a voltage difference between the first pixel electrode and the second pixel electrode is increased effectively due to capacitive coupling effect.

In order to make the aforementioned and other features and advantages of the invention more comprehensible, several embodiments accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

First Embodiment

Figure 1:
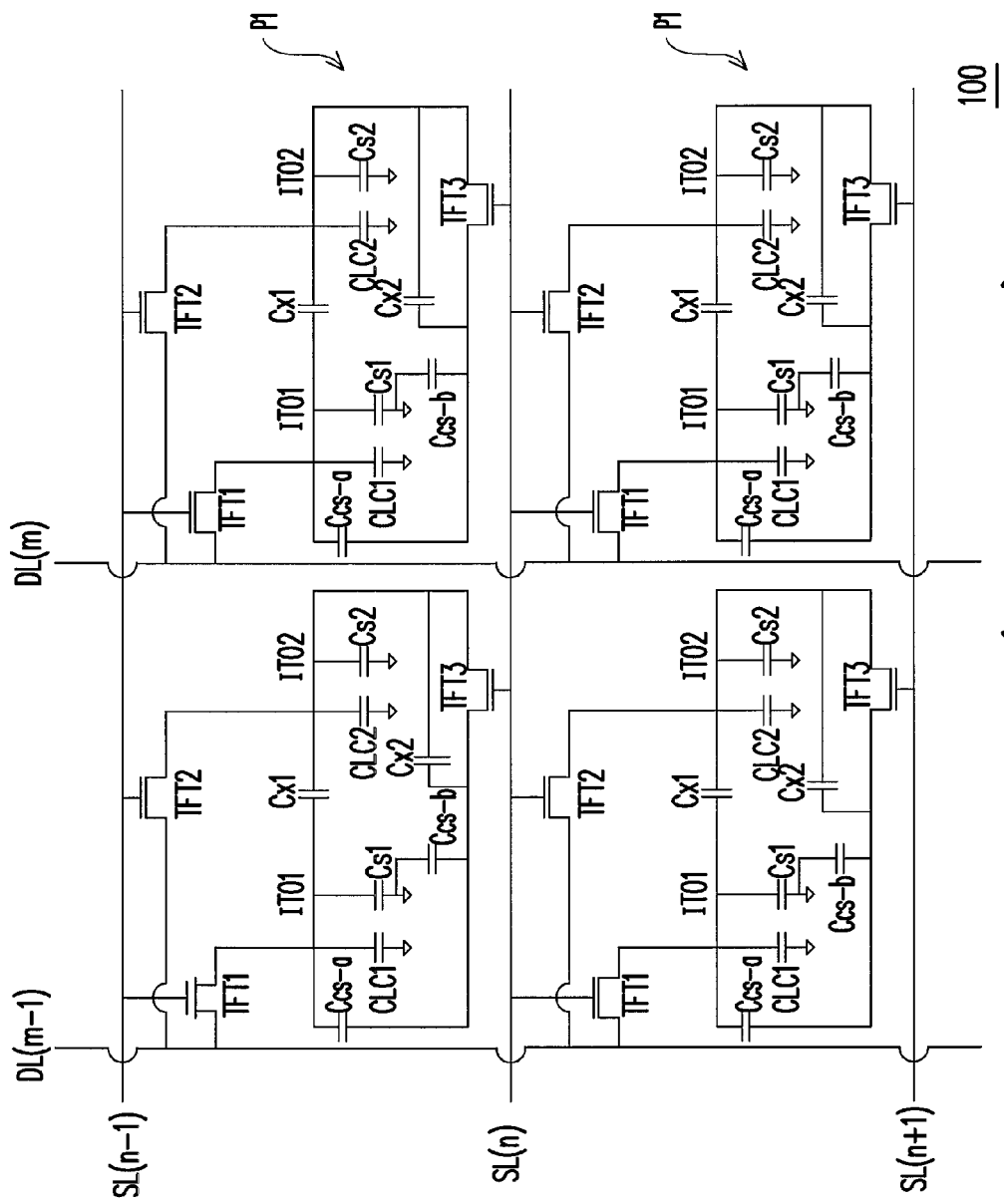
FIG. 1 is an equivalent circuit diagram of a pixel array.
Figure 2:
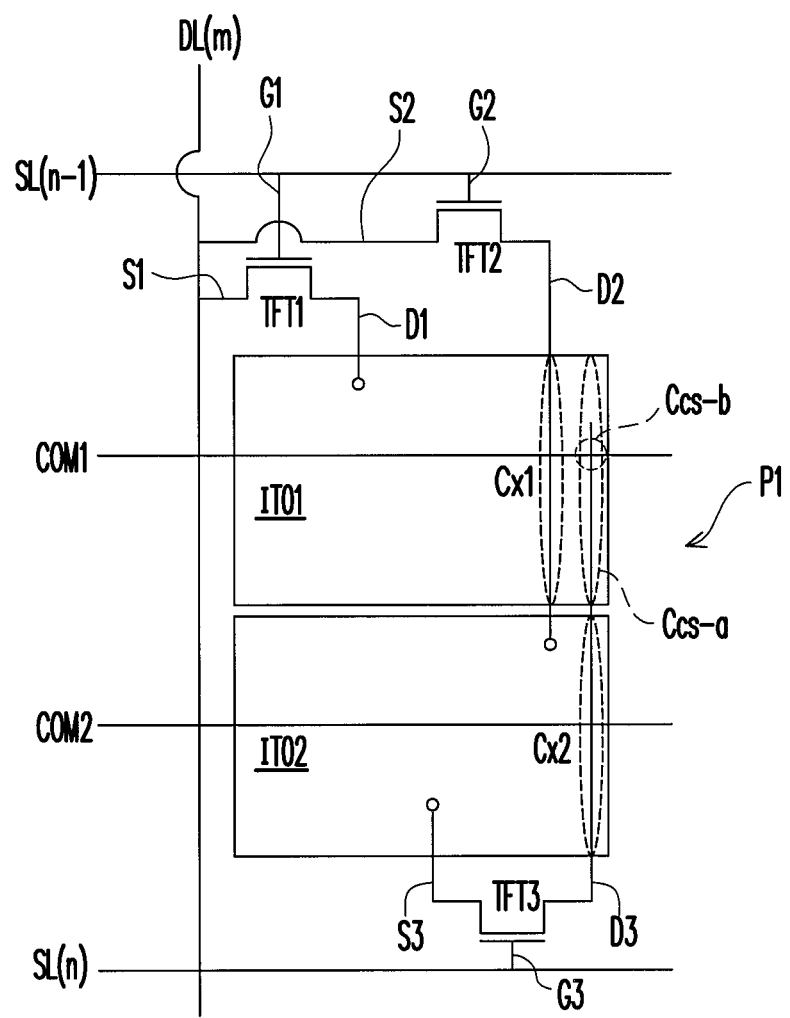
FIG. 2 illustrates a schematic diagram of a single sub-pixel in FIG. 1.
Figure 3:
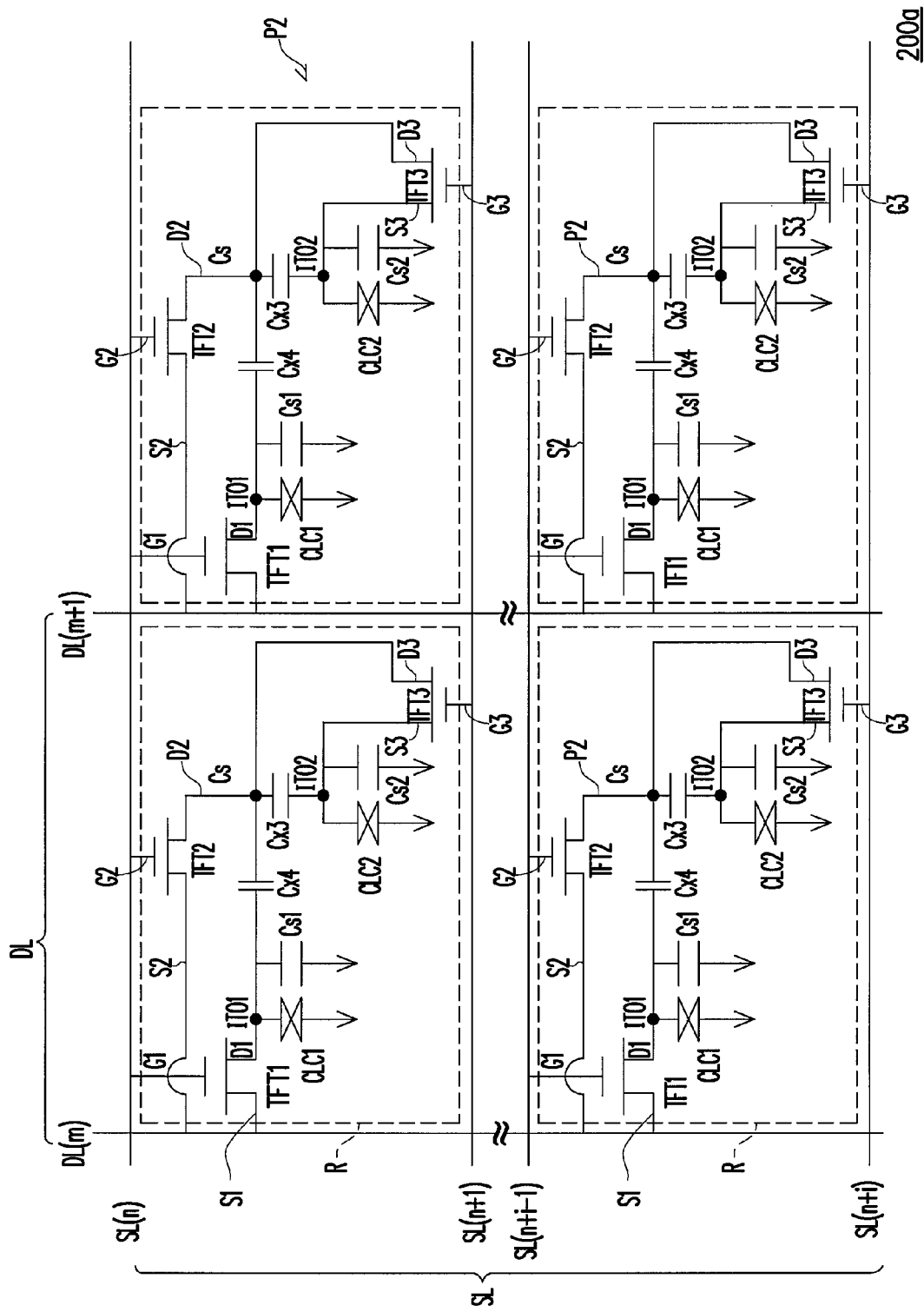
FIG. 3 illustrates a schematic diagram of a pixel array in a first embodiment of the invention.
Figure 4A:
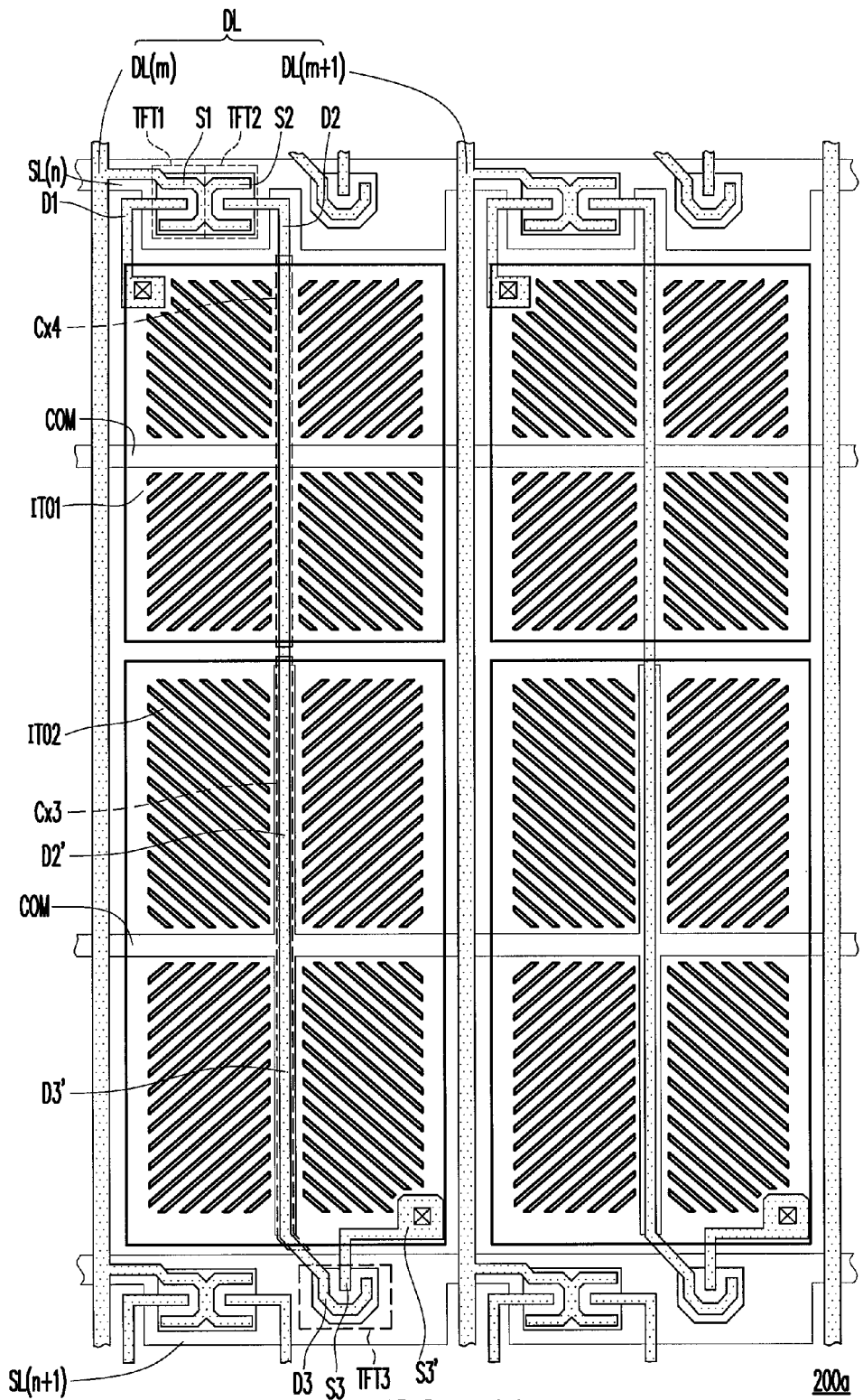
FIG. 4A illustrates a schematic layout diagram of the pixel array in the first embodiment of the invention.

FIG. 3 illustrates a schematic diagram of a pixel array in a first embodiment of the invention. FIG. 4A illustrates a schematic layout diagram of the pixel array in the first embodiment of the invention. Referring to FIGS. 3 and 4, a pixel array 200a of the present embodiment includes a plurality of scan lines SL (only scan lines SL(n), SL(n+1), SL(n+i−1), SL(n+i) are shown in FIGS. 3 and 4), a plurality of data lines DL (only data lines DL(m), DL(m+1) are shown in FIGS. 3 and 4), and a plurality sub-pixels P2. The data lines DL intersect with the scan lines SL to define a plurality of sub-pixel regions R. The sub-pixels P2 are disposed in the sub-pixel regions R respectively. It should be noted that FIGS. 3 and 4 only illustrate a portion of the sub-pixels P2, and the number of the sub-pixels P2 arranged in an array can be altered depending on an image resolution required for display.

Each of the sub-pixel P2 is electrically connected to two adjacent scan lines SL and one of the data lines DL. In the present embodiment, the sub-pixels P2 are arranged in a plurality of rows. The sub-pixels P2 arranged in an $n^{th}$ row are electrically connected to an $n^{th}$ scan line SL(n), an $(n+1)^{th}$ scan line SL(n+1), and the data line DL(m). In details, each of the sub-pixels P2 arranged in the $n^{th}$ row includes a first switch TFT1, a first pixel electrode ITO1, a second switch TFT2, a third switch TFT3, and a second pixel electrode ITO2. The first switch TFT1 and the second switch TFT2 are electrically connected to the $n^{th}$ scan line and an $m^{th}$ data line DL(m), and the second switch TFT2 has a first signal output terminal DT. The third switch TFT3 is electrically connected to an $(n+i)^{th}$ scan line SL(n+i). The third switch TFT3 has a signal input terminal D3' electrically connected to the first signal output terminal D2' and a second signal output terminal S3'. Here, i is a positive integer. In the present embodiment, i=1; that is, the third switch TFT3 is electrically connected to the $(n+1)^{th}$ scan line SL(n+1).

The second pixel electrode ITO2 is electrically connected to the second signal output terminal S3'. The first signal output terminal D2' extends to the underneath of the second pixel electrode ITO2 to generate a coupling capacitance Cx3 with the second pixel electrode ITO2. In addition, the first signal output terminal DT of the present embodiment further extends to the underneath of the first pixel electrode ITO1 such that a parasitic capacitance Cx4 is generated between the first signal output terminal D2' and the first pixel electrode ITO1. Moreover, in the present embodiment, the sub-pixels P2 arranged in the $n^{th}$ row is electrically connected to the $n^{th}$ scan line SL(n) and the $(n+1)^{th}$ scan line SL(n+1). The first pixel electrodes ITO1 and the second pixel electrodes ITO2 of the sub-pixels P2 arranged in the $n^{th}$ row are located between the $n^{th}$ scan line SL(n) and the $(n+1)^{th}$ scan line SL(n+1), for example.

As shown in FIGS. 3 and 4A, each of the first switches TFT1 arranged in the $n^{th}$ row is a first thin film transistor (TFT). The first TFT has a first gate G1, a first source S1, and a first drain D1. The first gate G1 is electrically connected to the $n^{th}$ scan line SL(n). The first source S1 is electrically connected to one of the data lines DL. The first drain D1 is electrically connected to the first pixel electrode ITO1.

Additionally, each of the second switches TFT2 arranged in the $n^{th}$ row is a second TFT. The second TFT has a second gate G2, a second source S2, and the first signal output terminal D2'. The second gate G2 is electrically connected to the $n^{th}$ scan line SL(n). The second source S2 is electrically connected to one of the data lines DL. It should be noted that the second drain D2 of the second TFT is the first signal output terminal D2'.

Each of the third switches TFT3 arranged in the $n^{th}$ row is a third TFT. The third TFT has a third gate G3, the signal input terminal D3', and the second signal output terminal S3'. The third gate G3 is electrically connected to the $(n+1)^{th}$ scan line SL(n+1). The third source S3 is electrically connected to the second pixel electrode ITO2. It should be noted that the signal input terminal D3' of the third TFT is the third drain D3, and the second signal output terminal S3' is the third source S3.

As shown in FIG. 4A, the pixel array 200a of the present embodiment further includes a plurality of common lines COM electrically connected to one another. The common lines COM are distributed underneath each of the first pixel electrodes ITO1 and each of the second pixel electrodes ITO2. In details, each of the common lines COM extends along a direction of the row.

Figure 5:
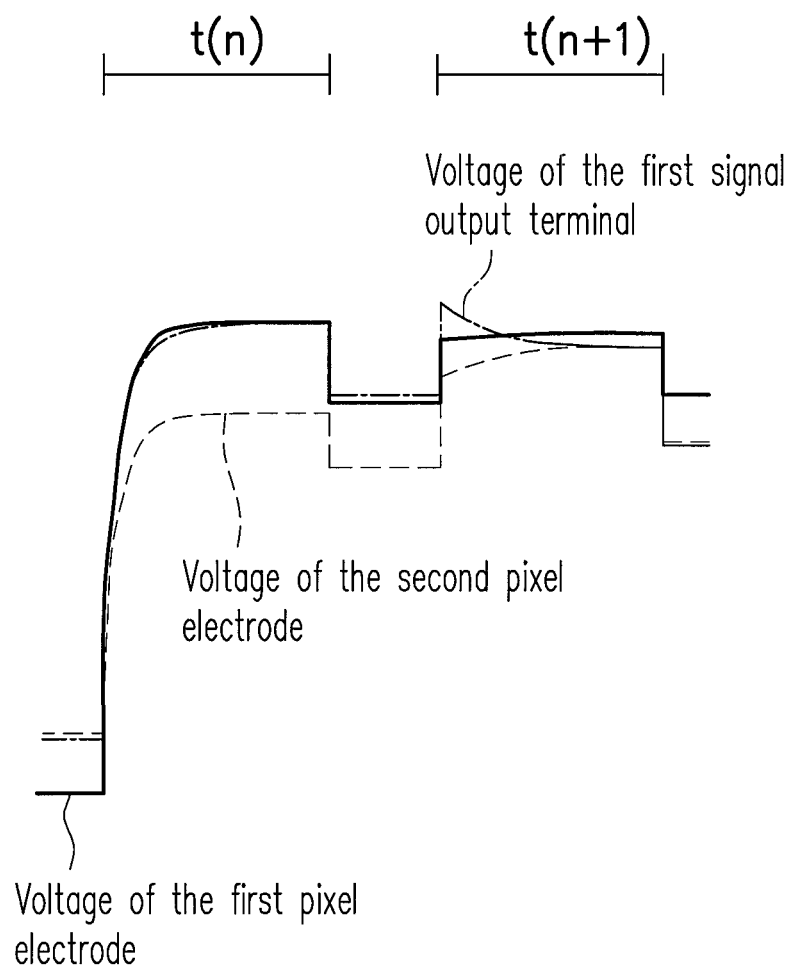
FIG. 5 is a schematic diagram showing voltage differences of a first pixel electrode, a second pixel electrode, and a first signal output terminal.

FIG. 5 is a schematic diagram showing voltage differences of the first pixel electrode, the second pixel electrode, and the first signal output terminal. Referring to FIGS. 4A and 5, when a turn on voltage (Vgh) is applied at time t(n), an image data is recorded into the sub-pixels connected to the scan line SL(n) from the data line DL(m) through the first switch TFT1. At this time, a voltage of the first pixel electrode ITO1 is increased. On the other hand, the image data is also recorded into the first signal output terminal D2' from the data line DL(m) through the second switch TFT2. At this time, a voltage of the first signal output terminal D2' and a voltage of the first voltage electrode ITO1 are substantially equal. Since the first signal output terminal D2' extends to the underneath of the second pixel electrode ITO2 so as to generate the coupling capacitance Cx3 with the second pixel electrode ITO2, a voltage of the second pixel electrode ITO2 is also increased due to the coupling effect. When the turn on voltage (Vgh) is not applied to the scan line SL(n), the voltages of the first pixel electrode ITO1, the second pixel electrode ITO2, and the first signal output terminal D2' are slightly decreased due to the feed through effect.

Subsequently, when the turn on voltage (Vgh) is applied to the scan line SL(n+1) at time t(n+1), the voltages of the first pixel electrode ITO1, the second pixel electrode ITO2, and the first signal output terminal D2' are increased again due to the application of the turn on voltage. On the other hand, the third switch TFT3 is turned on, so that the first signal output terminal D2' and the second pixel electrode ITO2 are conductive. With the re-distribution of charges, the voltage of the first signal output terminal D2' is gradually decreased and the voltage of the second pixel electrode ITO2 is gradually increased until the voltage of the first signal output terminal D2' substantially equals to the voltage of the second pixel electrode ITO2. Finally, as shown in FIG. 5, when the turn on voltage is not applied to the scan line SL(n+1), the voltages of the first pixel electrode ITO1 and the second pixel electrode ITO2 are slightly decreased due to the feed through effect, and the voltages of the first pixel electrode ITO1 and the second pixel electrode ITO2 are different.

Accordingly, through the coupling effect of the coupling capacitance Cx3, the voltage of the second pixel electrode ITO2 is increased simultaneously, but is still lower than the voltage of the first pixel electrode ITO1. In other words, the voltage of the first pixel electrode ITO1 and the voltage of the second pixel electrode ITO2 are different, and can thus reduce the color washout.

From another perspective, an embodiment of the invention also provides a method of driving a pixel array. The method includes the following. A plurality of scan lines SL is turned on sequentially, and an image data is recorded into each of a plurality of sub-pixels P2 through a plurality of data lines DL. When a turn on voltage is applied to an $n^{th}$ scan line SL(n) for turning on a first switch TFT1 and a second switch TFT2, a first pixel electrodes ITO1 and a first signal output terminals D2' of the sub-pixels arranged in an $n^{th}$ row are conducted with a corresponding data line DL(m), and a voltage of a second pixel electrode ITO2 is changed due to a coupling of the first signal output terminal D2'. When the turn on voltage is applied to an $(n+i)^{th}$ scan line SL(n+i) for turning on a third switch TFT3, the second pixel electrodes ITO2 and the first signal output terminals DT of the sub-pixels arranged in the $n^{th}$ row are conducted. Here, i is a positive integer and i=1 in the present embodiment. In the present embodiment when the turn on voltage is applied to the $(n+i)^{th}$ scan line SL(n+i) for turning on the third switch TFT3, the voltage of the second pixel electrode ITO2 is increased and a voltage of the first signal output terminal D2' is decreased.

Figure 4B:
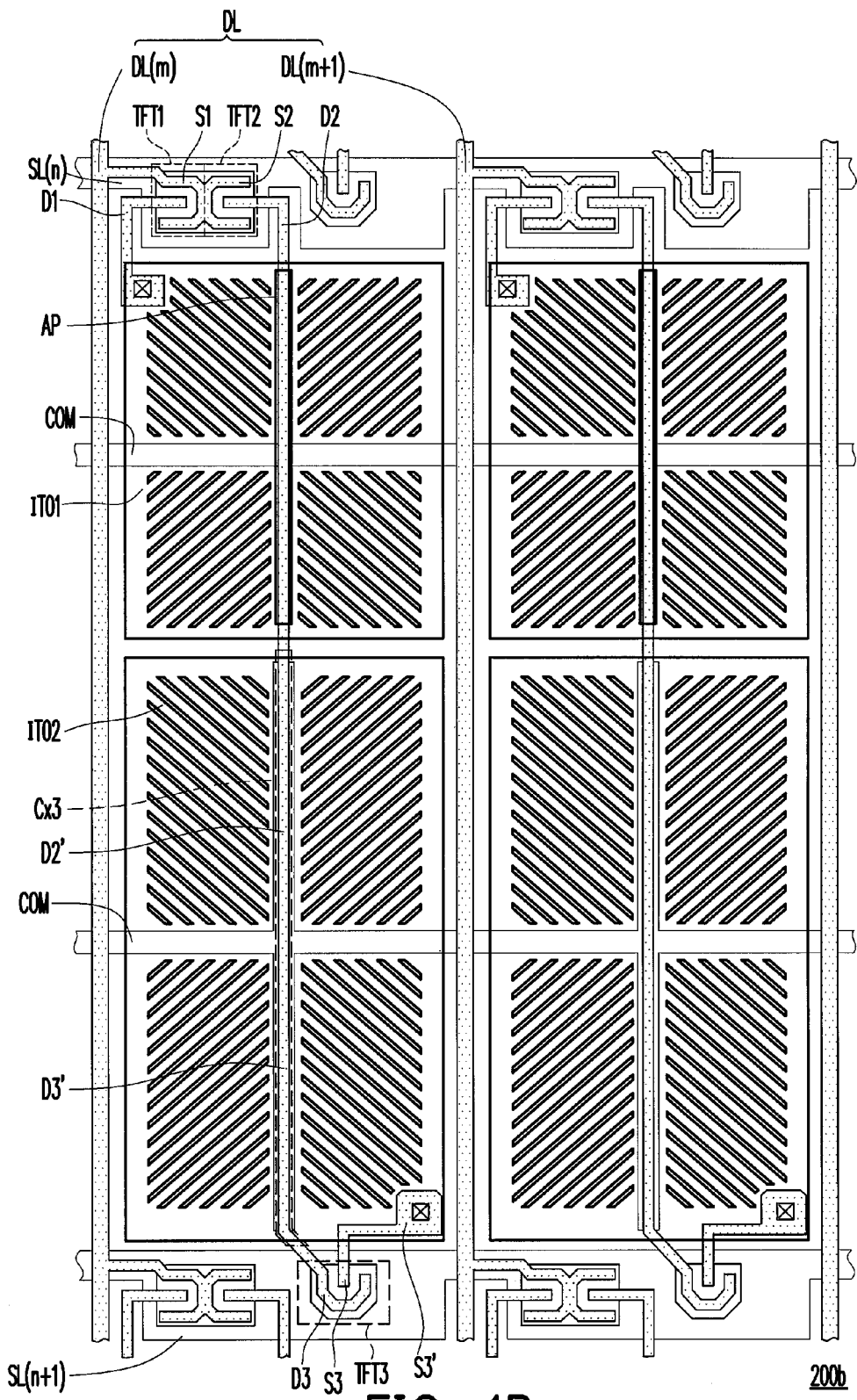
FIG. 4B illustrates a schematic layout diagram of a pixel array in another embodiment of the invention.

FIG. 4B illustrates a schematic layout diagram of a pixel array in another embodiment of the invention. A pixel array 200b of the present embodiment is similar to the pixel array 200a in FIG. 4A. However, the two pixel arrays are different in that the first pixel electrode ITO1 located above the first signal output terminal D2' has an opening AP for reducing a parasitic capacitance Cx4 generated between the first signal output terminal D2' and the first pixel electrode ITO1 in FIG. 4A. That is, in the present embodiment, the corresponding first pixel electrode ITO1 above the first signal output terminal DT is excavated or a dielectric layer between the first signal output terminal D2' and the first pixel electrode ITO1 is thickened to reduce the parasitic capacitance Cx4.

Figure 4C:
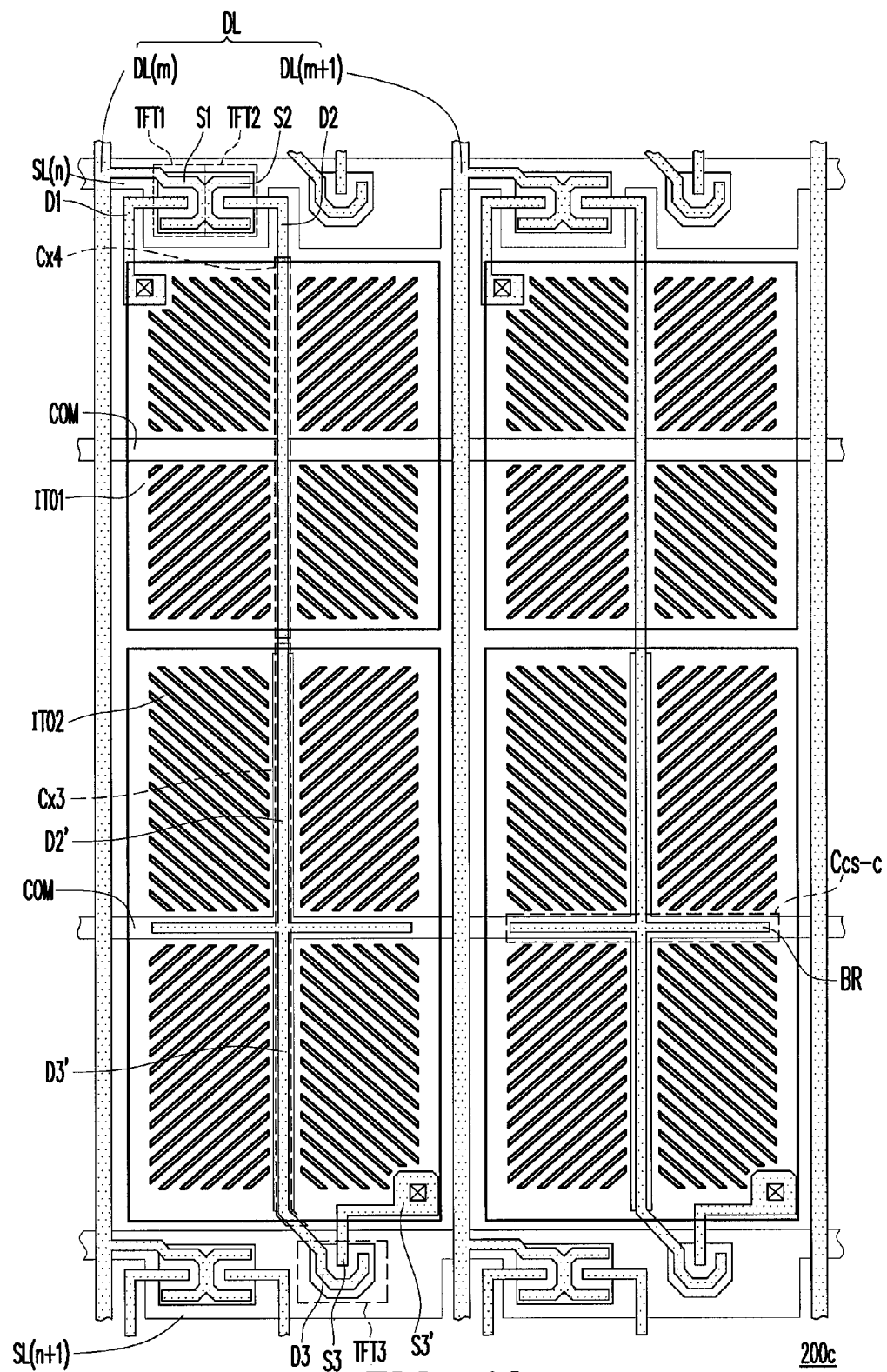
FIG. 4C illustrates a schematic layout diagram of a pixel array in another embodiment of the invention.

FIG. 4C illustrates a schematic layout diagram of a pixel array in another embodiment of the invention. A pixel array 200c of the present embodiment is similar to the pixel array 200a in FIG. 4. However, the two pixel arrays are different in that the first signal output terminal D2' and a signal input terminal D3' have a branch BR therebetween. The branch BR allows a portion of the first signal output terminal D2' and the common line COM underneath the second pixel electrode ITO2 couple to generate a first capacitance Ccs-c.

Second Embodiment

Figure 6:
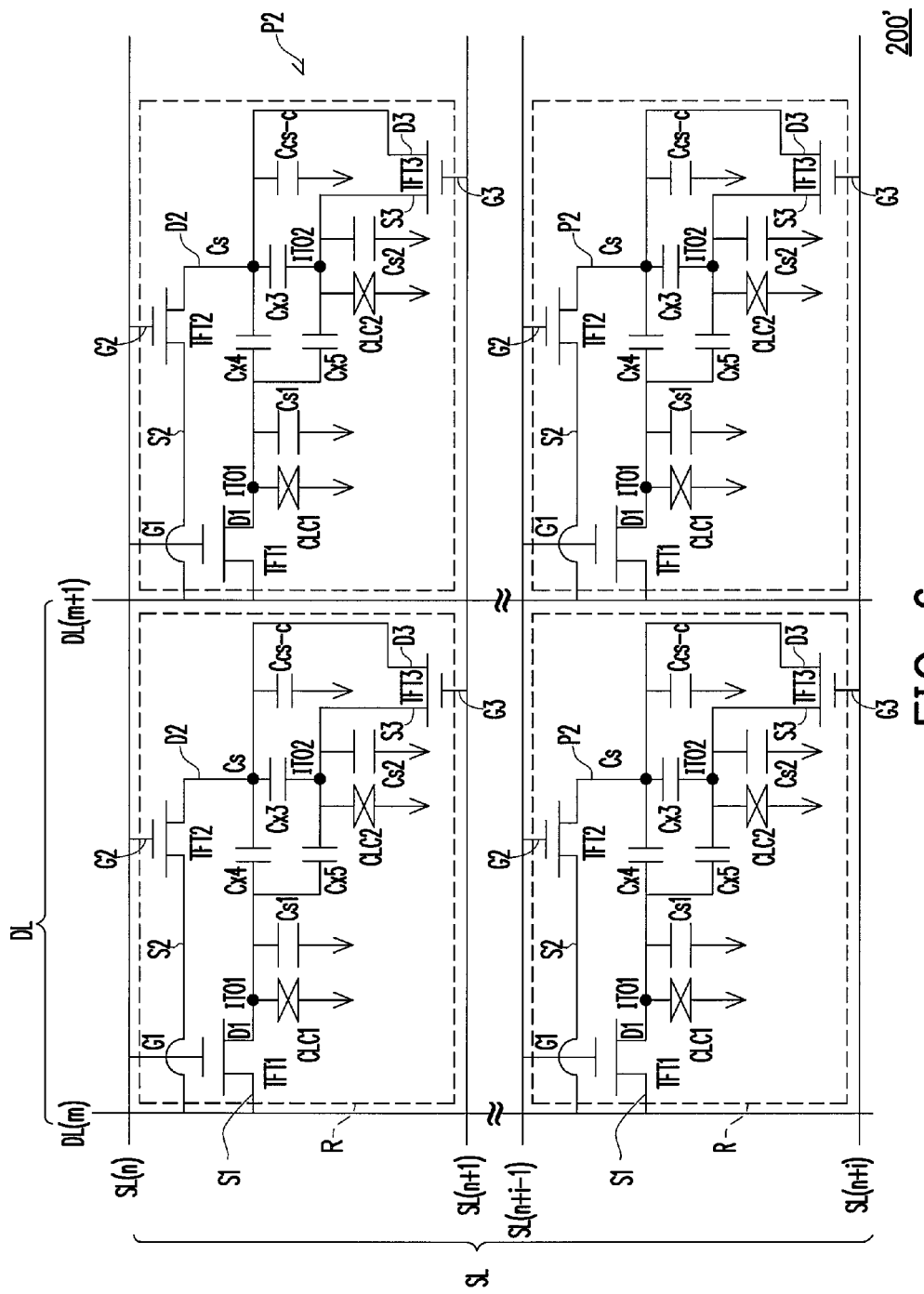
FIG. 6 illustrates a schematic layout diagram of a pixel array in a second embodiment of the invention.
Figure 7A:
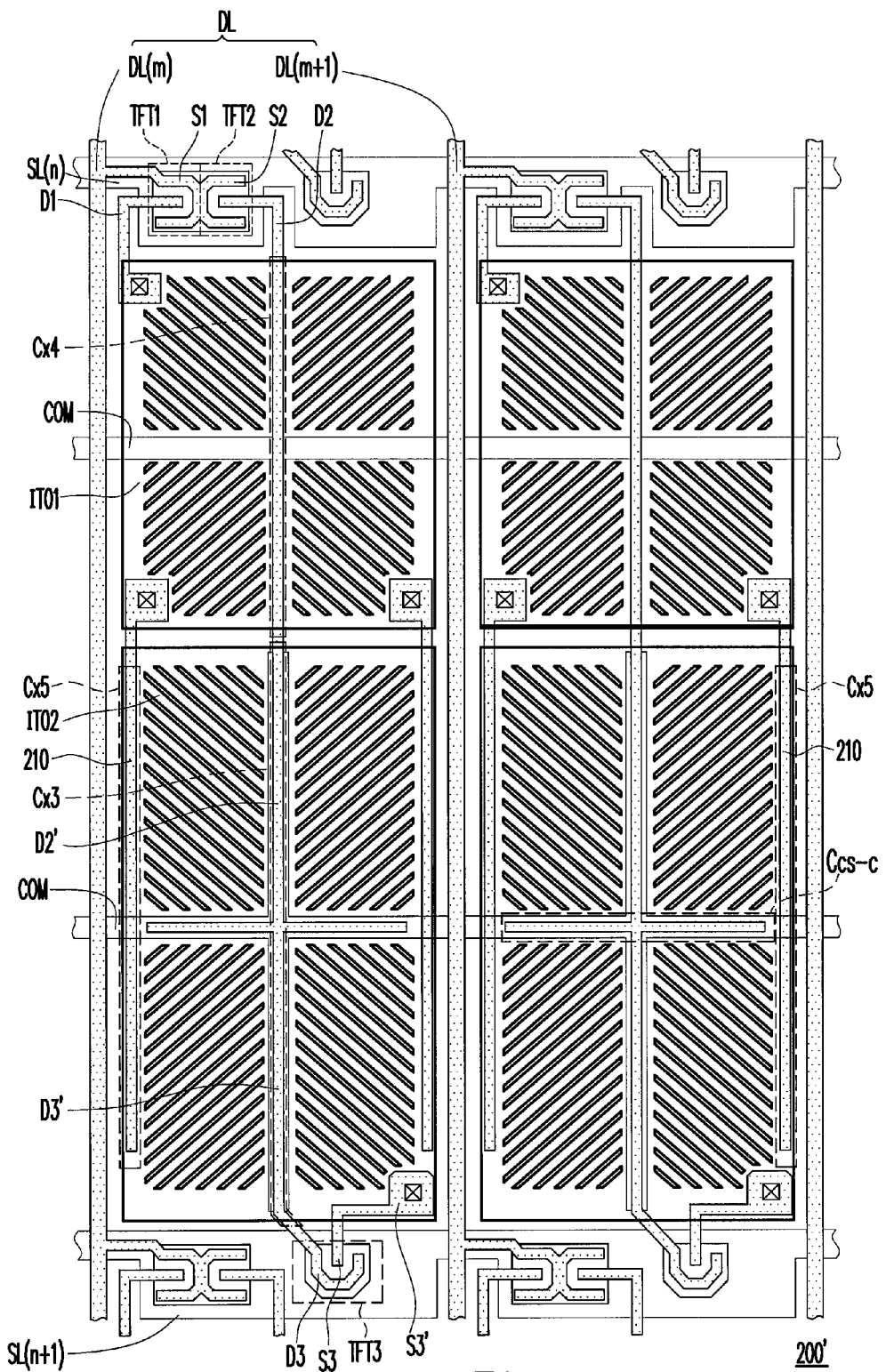
FIG. 7A illustrates a schematic layout diagram of the pixel array in the second embodiment of the invention.

FIG. 6 illustrates a schematic diagram of a pixel array in a second embodiment of the invention. FIG. 7A illustrates a schematic layout diagram of the pixel array in the second embodiment of the invention. Referring to FIGS. 6 and 7A, a pixel array 200' of the present embodiment is similar to the pixel array 200c in FIG. 4C. The difference between the two is that the pixel array 200' further includes at least one coupling conductor 210 (only two coupling conductors are shown in FIG. 7A). The coupling conductors 210 are electrically connected to a first pixel electrode ITO1. The coupling conductors 210 extend to the underneath of a second pixel electrode ITO2 such that a parasitic capacitance Cx5 is generated between the coupling conductors 210 and the second pixel electrode ITO2.

As shown in FIG. 7A, the coupling conductors of the present embodiment extend along an edge of the second pixel electrode ITO2. In the pixel array 200' of FIGS. 6 and 7A, the coupling capacitance Cx3 is the main part for improving color washout. The coupling effect of parasitic capacitance Cx5 generated between of the coupling conductors 210 and the second pixel electrode ITO2 effectively compensates (or reduces) coupling effect of a parasitic capacitance Cx4 between the first signal output terminal D2' and the first pixel electrode ITO1. Thus, a difference between a voltage of the first pixel electrode ITO1 and a voltage of the second pixel electrode ITO2 can be increased effectively for favorable display quality.

Figure 7B:
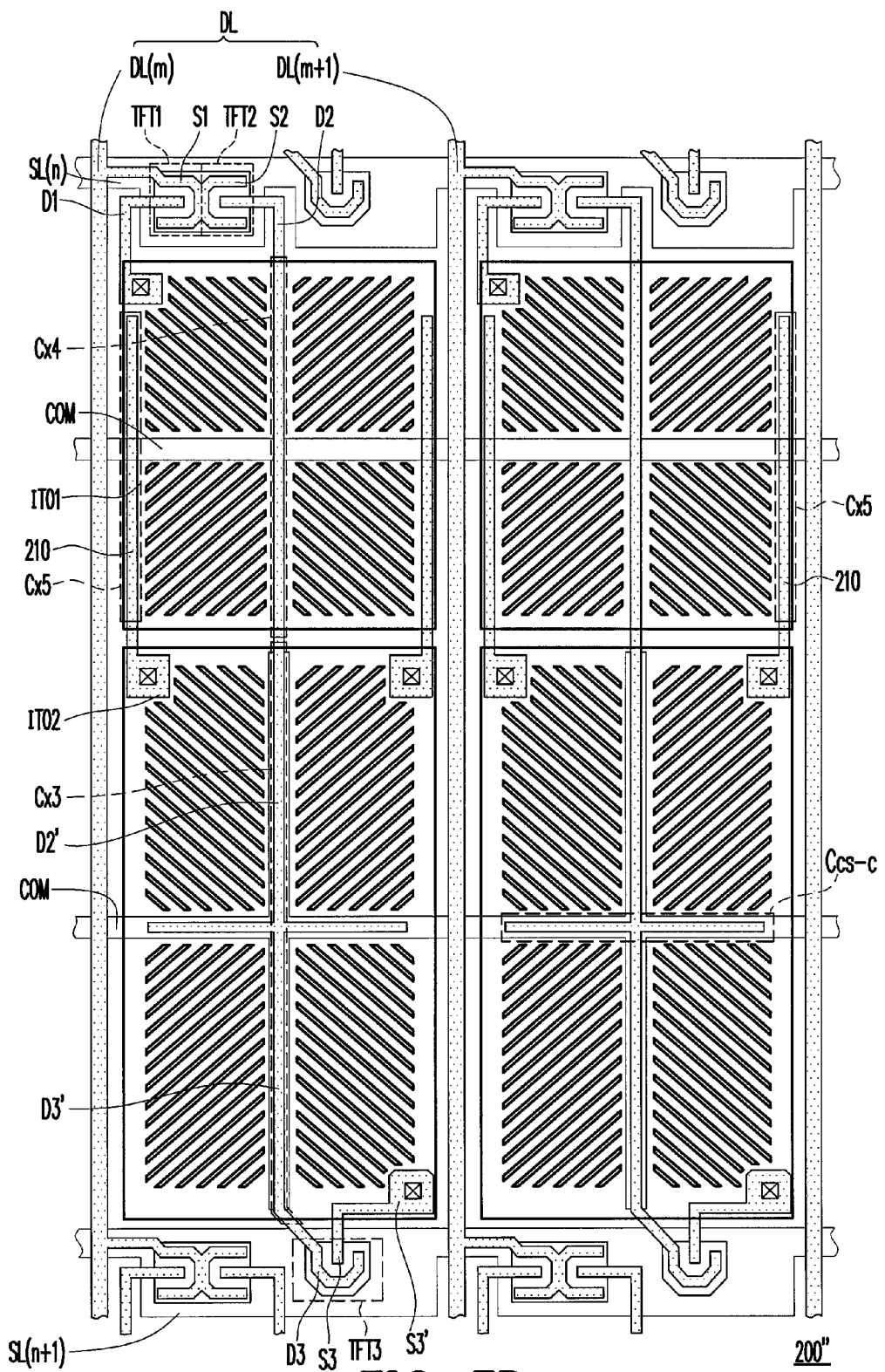
FIG. 7B illustrates a schematic layout diagram of a pixel array in another embodiment of the invention.

FIG. 7B illustrates a schematic layout diagram of a pixel array in another embodiment of the invention. A pixel array 200" of the present embodiment is similar to the pixel array 200' in 7A. However, the pixel arrays are different in that two coupling conductors 210 are electrically connected to a second pixel electrode ITO2. The coupling conductors 210 extend to the underneath of a first pixel electrode ITO1 such that a parasitic capacitance Cx5 is generated between the coupling conductors 210 and the first pixel electrode ITO1.

Other embodiments can be similar to the embodiments shown in FIGS. 7A and 7B. However, the difference is that a first pixel electrode ITO1 located above a first signal output terminal D2' has an opening AP for reducing the parasitic capacitance Cx4 generated between the first signal output terminal D2' and the first pixel electrode ITO1 in FIGS. 7A and 7B.

Third Embodiment

Figure 8:
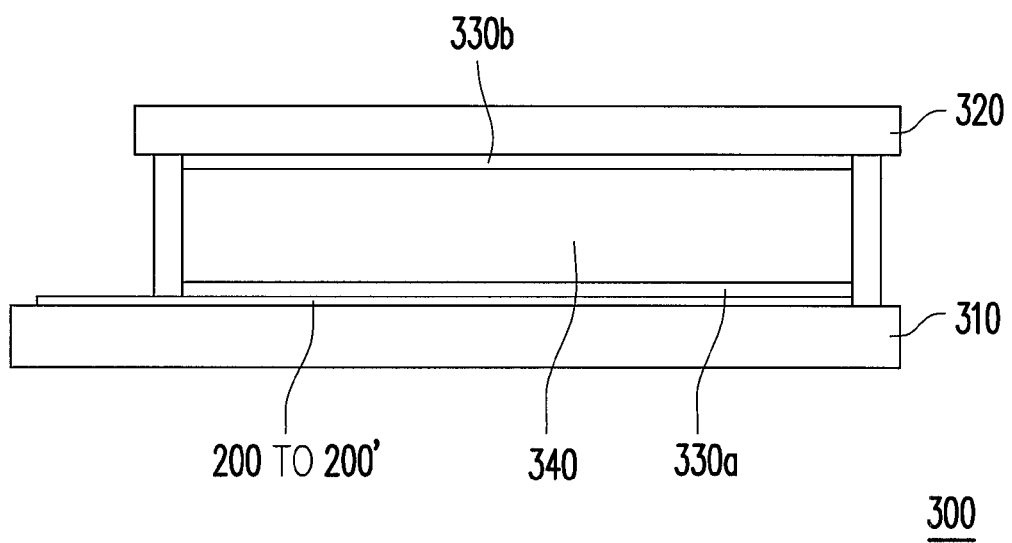
FIG. 8 depicts a schematic diagram of a polymer stabilized alignment liquid crystal display panel in the invention.

FIG. 8 depicts a schematic diagram of a polymer stabilized alignment liquid crystal display (PSA-LCD) panel in the invention. Referring to FIG. 8, a PSA-LCD panel 300 of the present embodiment includes a first substrate 310, a second substrate 320, two PSA layers 330a, 330b, and a LC layer 340. The first substrate 310 has a pixel array (200 or 200') as shown in the First Embodiment or the Second Embodiment. The second substrate 320 is disposed above the first substrate 310. The two PSA layers 330a, 330b are disposed on the first substrate 310 and the second substrate 320 respectively. The LC layer 340 is disposed between the two PSA layers 330a and 330b. It should be noted that the LC layer 340 is fabricated using a liquid crystal material including monomers that can be polymerized by an energy source. When the light source (i.e. ultraviolet light) is applied to the LC layer 340, the monomers that can be polymerized by the light source are polymerized on surface of the first substrate 310 and the second substrate 320 respectively to form the two PSA layers 330a, 330b.

In summary, since the first signal output terminal of the second switch is electrically connected to the third switch, the third switch is electrically connected to the second pixel electrode, and coupling capacitance is generated between the first signal output terminal and the second pixel electrode, a voltage difference between the first pixel electrode and the second pixel electrode is increased effectively due to capacitive coupling effect. As a consequence, the pixel array of the invention can provide favorable image quality.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A pixel array, comprising:
a plurality of scan lines;
a plurality of data lines, intersected with the scan lines to define a plurality of sub-pixel regions;
a plurality of sub-pixels, disposed in the sub-pixel regions, each of the sub-pixels electrically connected to two adjacent scan lines and one of the data lines, wherein each of the sub-pixels arranged in an $n^{th}$ row comprises:
a first switch;
a first pixel electrode, electrically connected to the first switch;
a second switch, wherein the first switch and the second switch are electrically connected to an $n^{th}$ scan line and an $m^{th}$ data line, and the second switch has a first signal output terminal;
a third switch, electrically connected to an $(n+i)^{th}$ scan line, wherein the third switch has a signal input terminal electrically connected to the first signal output terminal and a second signal output terminal, and i is a positive integer;
a second pixel electrode, electrically connected to the second signal output terminal, wherein the first signal output terminal is electrically insulated from the first pixel electrode and the second pixel electrode, and the first signal output terminal extends to an underneath of the second pixel electrode such that a coupling capacitance is generated between the first signal output terminal and the second pixel electrode, wherein the first signal output terminal extends to an underneath of the first pixel electrode such that a first parasitic capacitance is generated between the first signal output terminal and the first pixel electrode; and
at least one coupling conductor electrically connected to the first pixel electrode, wherein the coupling conductor extends to the underneath of the second pixel electrode such that a second parasitic capacitance is generated between the coupling conductor and the second pixel electrode.

2. The pixel array as claimed in claim 1, wherein the sub-pixels are arranged in multiple rows, and the sub-pixels arranged in the $n^{th}$ row are electrically connected to the $n^{th}$ scan line and the $(n+1)^{th}$ scan line.

3. The pixel array as claimed in claim 1, wherein the first pixel electrode and the second pixel electrode of each of the sub-pixels arranged in the $n^{th}$ row are located between the $n^{th}$ scan line and the $(n+1)^{th}$ scan line.

4. The pixel array as claimed in claim 1, wherein each of the first switches in the $n^{th}$ row is a first thin film transistor, and the first thin film transistor has a first gate electrically connected to the $n^{th}$ scan line, a first source electrically connected to one of the data lines, and a first drain electrically connected to the first pixel electrode.

5. The pixel array as claimed in claim 1, wherein each of the second switches in the $n^{th}$ row is a second thin film transistor, and the second thin film transistor has a second gate electrically connected to the $n^{th}$ scan line, a second source electrically connected to one of the data lines, and the first signal output terminal.

6. The pixel array as claimed in claim 1, wherein each of the third switches in the $n^{th}$ row is a third thin film transistor, and the third thin film transistor has a third gate electrically connected to the $(n+1)^{th}$ scan line, the signal input terminal, and the second signal output terminal.

7. The pixel array as claimed in claim 1, wherein the coupling conductor extends along an edge of the second pixel electrode.

8. A polymer stabilized alignment liquid crystal display panel, comprising:
a first substrate, having a pixel array as claimed in claim 1;
a second substrate, disposed above the first substrate;
two polymer stabilized alignment layers, disposed on the first substrate and the second substrate respectively; and
a liquid crystal layer, disposed between the polymer stabilized alignment layers.

9. A driving method of a pixel array, adapted for driving a pixel array as claimed in claim 1, the driving method of the pixel array comprising:
turning on the scan lines sequentially and recording an image data to each of the sub-pixels through the data lines; when a turn on voltage is applied to an $n^{th}$ scan line for turning on the first switch and the second switch, conducting the first pixel electrodes and the first signal output terminals of the sub-pixels arranged in an $n^{th}$ row with a corresponding data line, and changing a voltage of the second pixel electrode due to a coupling of the first signal output terminal; when a turn on voltage is applied to an $(n+i)^{th}$ scan line for turning on the third switch, conducting the second pixel electrodes and the first signal output terminals of the sub-pixels arranged in the $n^{th}$ row, wherein when a turn on voltage is applied to the $(n+i)^{th}$ scan line for turning on the third switch, the voltage of the second pixel electrode increases and a voltage of the first signal output terminal decreases.

10. A pixel array, comprising:
a plurality of scan lines;
a plurality of data lines, intersected with the scan lines to define a plurality of sub-pixel regions;
a plurality of sub-pixels, disposed in the sub-pixel regions, each of the sub-pixels electrically connected to two adjacent scan lines and one of the data lines, wherein each of the sub-pixels arranged in an $n^{th}$ row comprises:
a first switch;
a first pixel electrode, electrically connected to the first switch;
a second switch, wherein the first switch and the second switch are electrically connected to an $n^{th}$ scan line and an $m^{th}$ data line, and the second switch has a first signal output terminal;
a third switch, electrically connected to an $(n+i)^{th}$ scan line, wherein the third switch has a signal input terminal electrically connected to the first signal output terminal and a second signal output terminal, and i is a positive integer;
a second pixel electrode, electrically connected to the second signal output terminal, wherein the first signal output terminal is electrically insulated from the first pixel electrode and the second pixel electrode, and the first signal output terminal extends to an underneath of the second pixel electrode such that a coupling capacitance is generated between the first signal output terminal and the second pixel electrode, wherein the first signal output terminal extends to an underneath of the first pixel electrode such that a first parasitic capacitance is generated between the first signal output terminal and the first pixel electrode; and
at least one coupling conductor electrically connected to the second pixel electrode, wherein the coupling conductor extends to the underneath of the first pixel electrode such that a second parasitic capacitance is generated between the coupling conductor and the first pixel electrode.

11. The pixel array as claimed in claim 10, wherein the coupling conductor extends along an edge of the first pixel electrode.

12. A polymer stabilized alignment liquid crystal display panel, comprising:
a first substrate, having a pixel array as claimed in claim 10;
a second substrate, disposed above the first substrate;
two polymer stabilized alignment layers, disposed on the first substrate and the second substrate respectively; and
a liquid crystal layer, disposed between the polymer stabilized alignment layers.

* * * * *